US010738859B2

(12) United States Patent
Nilsson et al.

(10) Patent No.: US 10,738,859 B2
(45) Date of Patent: Aug. 11, 2020

(54) VEHICLE DRIVELINE SYSTEM

(71) Applicant: BorgWarner Sweden AB, Landskrona (SE)

(72) Inventors: Henrik Nilsson, Eslöv (SE); Warren Bates, Lund (SE); Kristoffer Nilsson, Lund (SE)

(73) Assignee: BORGWARNER SWEDEN AB, Landskrona (SE)

( * ) Notice: Subject to any disclaimer, the term of this patent is extended or adjusted under 35 U.S.C. 154(b) by 0 days.

(21) Appl. No.: 15/778,077

(22) PCT Filed: Nov. 24, 2016

(86) PCT No.: PCT/EP2016/078648
§ 371 (c)(1),
(2) Date: May 22, 2018

(87) PCT Pub. No.: WO2017/089449
PCT Pub. Date: Jun. 1, 2017

(65) Prior Publication Data
US 2018/0340595 A1 Nov. 29, 2018

(30) Foreign Application Priority Data
Nov. 24, 2015 (SE) ...................................... 1551527

(51) Int. Cl.
*B60K 1/02* (2006.01)
*F16H 3/72* (2006.01)
*B60K 1/00* (2006.01)
*B60K 6/365* (2007.10)

(52) U.S. Cl.
CPC ............... *F16H 3/725* (2013.01); *B60K 1/00* (2013.01); *B60K 1/02* (2013.01); *B60K 6/365* (2013.01); *F16H 3/728* (2013.01); *B60K 2001/001* (2013.01); *B60L 2240/421* (2013.01); *B60L 2240/423* (2013.01)

(58) Field of Classification Search
CPC ......... F16H 3/725; F16H 3/728; B60K 6/365; B60K 1/02
See application file for complete search history.

(56) References Cited

U.S. PATENT DOCUMENTS

| 6,306,057 | B1* | 10/2001 | Morisawa | B60K 6/365 475/5 |
| 6,344,008 | B1* | 2/2002 | Nagano | B60K 6/365 475/1 |
| 9,463,687 | B2* | 10/2016 | Kaltenbach | B60K 6/365 |
| 9,669,697 | B2* | 6/2017 | Mueller | B60K 6/365 |

(Continued)

*Primary Examiner* — Patrick H Mackey
(74) *Attorney, Agent, or Firm* — Young Basile Hanlon & MacFarlane, P.C.

(57) ABSTRACT

A vehicle driveline system for a vehicle is provided. The system comprises a differential (110) having two output shafts (111,112) being connectable with respective wheel shafts, a primary electrical motor (121) being connected with a driving input (117) of the differential (110) via a first reduction gearing (130), said first reduction gearing (130) being connected to a secondary electrical motor (122) for adjusting the gear ratio of the first reduction gearing (130); whereby the secondary electrical motor (122) is connected to a clutch arrangement (150) configured to selectively lock the gear ratio of the first reduction gearing (130).

11 Claims, 4 Drawing Sheets

(56) References Cited

U.S. PATENT DOCUMENTS

| | | | |
|---|---|---|---|
| 10,214,092 B2 * | 2/2019 | Yang | B60K 6/36 |
| 10,232,839 B2 * | 3/2019 | Yang | B60L 3/108 |
| 2012/0270691 A1 * | 10/2012 | Tuckfield | F16H 3/728 |
| | | | 475/5 |
| 2014/0100071 A1 * | 4/2014 | Kimes | B60K 1/02 |
| | | | 475/5 |
| 2016/0325725 A1 * | 11/2016 | Yang | B60K 1/02 |

* cited by examiner

VEHICLE DRIVELINE SYSTEM

This application claims the benefit of Swedish Application No. 1551527-3 filed Nov. 24, 2015, and PCT Application No. EP2016/078648 filed Nov. 24, 2016.

TECHNICAL FIELD

The present invention relates to a vehicle driveline system for a vehicle. More particularly, the present invention relates to a vehicle driveline system comprising an electrical motor allowing for purely electric drive or hybrid drive of the vehicle.

BACKGROUND

Electric powertrains for passenger cars are gaining interest and various solutions for such applications have been proposed during the recent years. Such powertrains may either provide purely electric drive or hybrid drive. Especially it has been suggested to provide the hybrid functionality as a separate module which is added to the existing powertrain.

Current solutions of electric powertrains are limited to one-gear transmission. A number of drawbacks are therefore associated with prior art electric driveline systems. For example, due to high torque requirements it is difficult to reduce the size of the electrical drive motor. Further, it is difficult to optimize the total efficiency of the driveline system, including the tital power consumption of the electrical drive motor, the transmission, and the power electronics.

SUMMARY

An object of the invention is therefore to provide a vehicle driveline system overcoming the drawbacks of the prior art. Especially an idea of the present invention is to provide a vehicle driveline system being capable of changing the reduction gear ratio between the electrical motor and the differential. This provides a number of advantages. The electrical drive motor may be made smaller, which allows for improved packing and a more cost-effective solution. Especially, a higher gear reduction of the low gear(s) reduces the torque requirement of the electrical drive motor, as the higher gear reduction is used to reach maximum speed without overspeeding the electrical drive motor. Further, the provision of two or more gears it is possible to select the gear which optimizes the system efficiency, thus providing a higher ranger and/or a smaller and cheaper battery.

According to a first aspect, a vehicle driveline system for a vehicle is provided. The system comprises a differential having two output shafts being connectable with respective wheel shafts, a primary electrical motor being connected with a driving input of the differential via a first reduction gearing, said first reduction gearing being connected to a secondary electrical motor for adjusting the gear ratio of the first reduction gearing; whereby the secondary electrical motor is connected to a clutch arrangement configured to selectively lock the gear ratio of the first reduction gearing.

According to a second aspect, a vehicle driveline system for a vehicle is provided. The system comprises a differential having two output shafts being connectable with respective wheel shafts, a primary electrical motor being connected with a driving input of the differential via a first reduction gearing; whereby the first reduction gearing comprises a dual clutch arrangement configured to adjust the gear ratio of the first reduction gearing.

Preferred embodiments are defined by the appended dependent claims.

DETAILED DESCRIPTION

Figure 1:
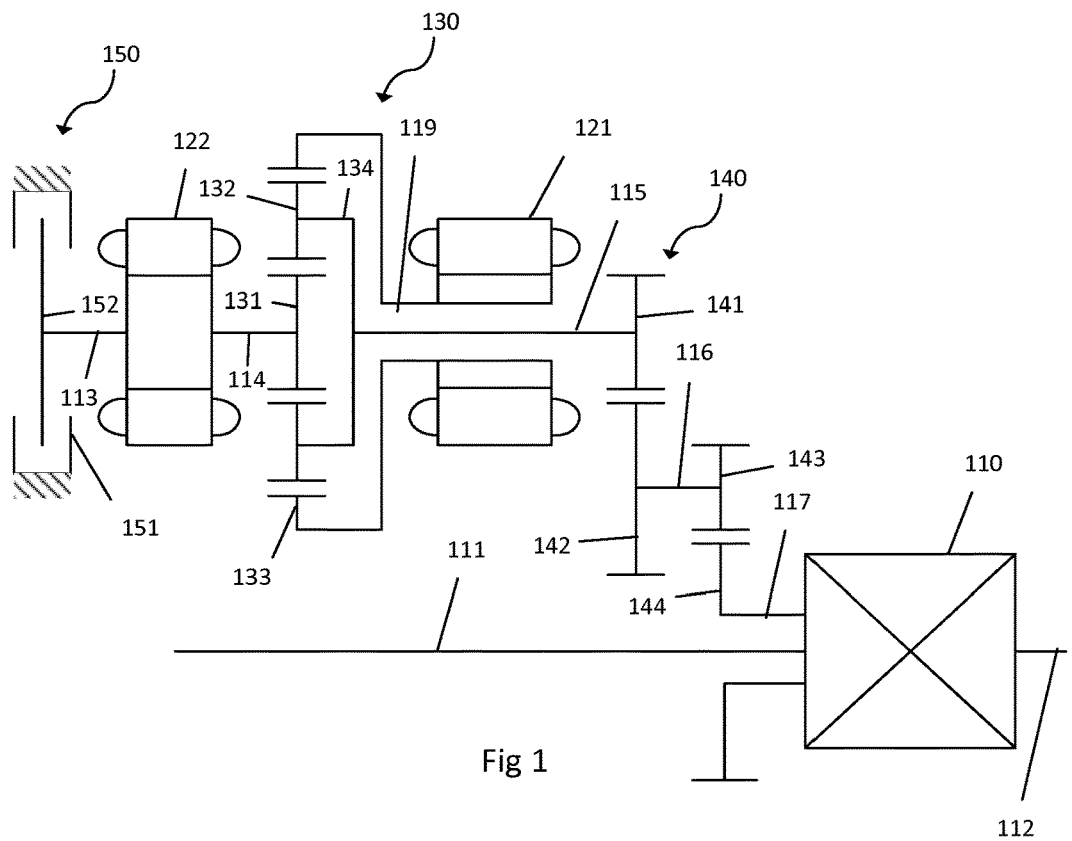
FIG. 1 shows a schematic outline of a vehicle drive system enabling hybrid drive and variable transmission according to an embodiment.

In FIG. 1 a vehicle driveline system intended for a vehicle is shown. The vehicle driveline system is configured to be used on either the front or rear axle of the vehicle in order to allow for selective hybrid drive of the associated axle. The vehicle may thus be a front wheel drive vehicle, a rear wheel drive vehicle, or an all wheel drive vehicle. The system shown in FIG. 1 could e.g. be mounted at a rear axle of a front wheel driven vehicle and the system comprises a differential 110 for distributing the drive torque to respective wheel shafts (not shown). The differential 110 has two output shafts 111 and 112 intended for driving the wheel shafts.

In order to provide hybrid drive a primary electrical motor 121 is provided. Said primary electrical motor 121 is configured to provide torque to the differential 110 and thereby provide electric drive of the output shafts 111 and 112.

Since the primary electrical motor 121 usually is configured to provide a high rotational speed, speed reduction preferably is normally required.

Therefore, the vehicle driveline system further comprises a secondary electrical motor 122. The primary electrical motor 121 is connected with the secondary electrical motor 122 via a first reduction gearing 130. The first reduction gearing 130 is drivingly connected to a drive input 117, i.e. the differential cage, of the differential 100. Preferably, each one of the primary electrical motor 121 and the secondary electrical motor 122 is connected to the differential 110 via the first reduction gearing 130.

Further referring to FIG. 1 the secondary electrical motor 122 is connected to a clutch arrangement 150 configured to selectively lock the gear ratio of the first reduction gearing 130.

The clutch arrangement 150 comprises a lock-up clutch 151 configured to selectively lock a disc 152 attached to a first secondary electrical motor shaft 113 connected to the secondary electrical motor 122. However, other variants of the lock-up clutch 150 are also possible within the context of this specification.

In order to provide a less space consuming system the primary 121 and the secondary 122 electrical motors are disposed substantially coaxially to each other. This is achieved by the first reduction gearing 130 being a planetary gearing which will be described further below.

Still referring to FIG. 1, the primary electrical motor 121 is connected to the first reduction gearing 130 via a primary electrical motor hollow shaft 119 attached to a first gear 133, e.g. a ring wheel, of the first reduction gearing 130.

As seen in FIG. 1 the secondary electrical motor 122 is connected to a second reduction gear 131 of the first reduction gearing 130, which in the described example is a sun wheel of the first reduction gearing 130.

Preferably, said sun wheel 131 is connected to the secondary electrical motor 122 by being attached to a second secondary electrical motor shaft 114.

The first reduction gearing 130 provides torque from the primary electrical motor 121 via a planet carrier 134 extending into a first reduction gearing shaft 115 connected to the ring wheel 134 via a set of planet gears 132.

To achieve a less space consuming arrangement the primary 121 and secondary 122 electrical motor are substantially coaxially arranged, which is enabled due to the first 113 and second 114 secondary electrical motor shaft being coaxial in relation to the first reduction gearing shaft 115.

The continuous variable transmission can thus be achieved by the secondary electrical motor 122 being activated to rotate the sun wheel 131 of the first reduction gearing 130. A higher speed provided by the secondary electrical motor 122 reduces the reduction of the first reduction gearing 130, whereby the speed provided to the differential 110 can be variably adjusted by control of the secondary electrical motor 122.

The first reduction gearing 130 is preferably connected to the differential 110 via a second reduction gearing 140. Thereby, the transmission ratio may be varied further.

To enable a more compact arrangement, the second reduction gearing 140 comprises a gear 141 attached to the first reduction gear shaft 115, i.e. the output of the first reduction gearing 130. Said gear 141 meshes with another gear 142 attached to a secondary reduction gearing shaft 116, whereby an additional gear 143 also is attached to said secondary reduction gearing shaft 116. The second reduction gearing 140 connects to the differential 110 by a gear 144 meshing with the gear 143, whereby the gear 144 is attached to a hollow differential shaft 117 connected with the differential 110.

Figure 2:
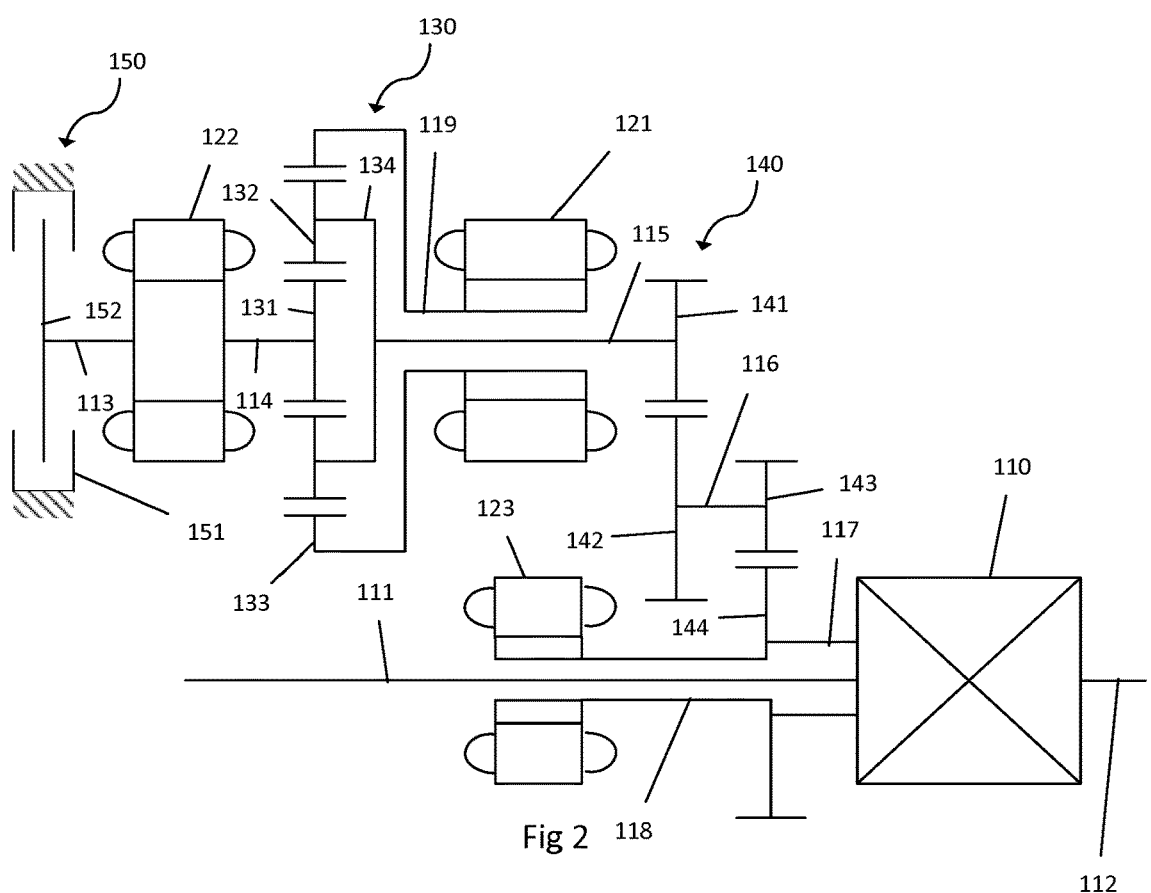
FIG. 2 shows a schematic outline of a vehicle drive system enabling hybrid drive and variable transmission according to an embodiment.

FIG. 2 shows an example wherein the embodiment of FIG. 1 is further provided with a third electrical motor 123 to achieve a power split function. This is achieved by the third electrical motor 123 being allowed to be controlled independently and, upon activation, compensate for the torque loss of the first electrical motor 121 when the second electrical motor 122 is activated.

Accordingly, the third electrical motor 123 is configured to transfer torque to the second reduction gearing 140 (e.g. to the differential 110 via the second reduction gearing 140).

As seen in FIG. 2, the third electrical motor 123 is connected to the second reduction gearing 140 and thereby to the differential 110. Thus, the third electrical motor 123 is configured to transfer torque to both the first reduction gearing 130 via the first reduction gearing shaft 115 and the planet carrier 134, as well as the differential 110.

Advantageously, the third electrical motor 123 is disposed coaxially to the differential. Thus, a more compact vehicle driveline system is achieved. This is enabled by the third electrical motor 123 being connected to the differential 110 via a hollow third electrical motor shaft 118. Said hollow third electrical motor shaft 118 extends into the hollow differential shaft 117 connected to the differential 110. Thus, the first gear 144 of the second reduction gearing 140 is attached to said hollow third electrical motor shaft 118.

The activation of the secondary electrical motor 122 leads to torque "leaking" out of the system. Thus, the third electrical motor 123 is configured to provide additional torque proportional to the torque loss associated with the activation of the secondary electrical motor 122, whereby a more energy efficient system can be achieved.

Figure 3:
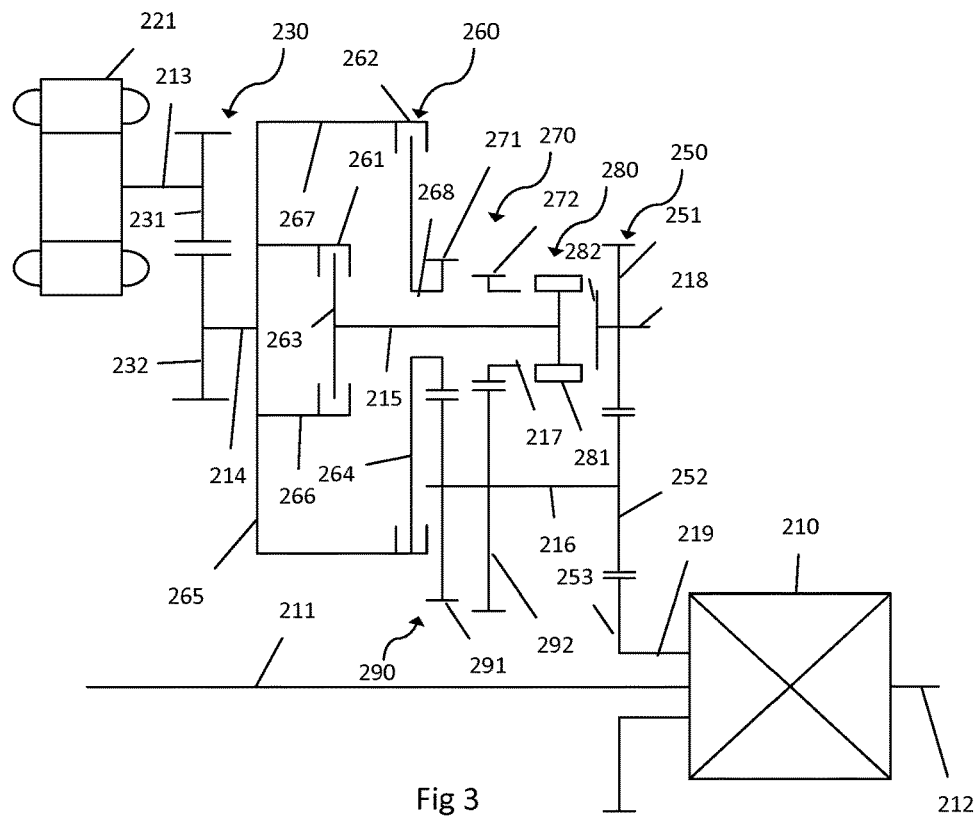
FIG. 3 shows a schematic outline of a vehicle drive system enabling hybrid drive and variable transmission according to an embodiment.
Figure 4:
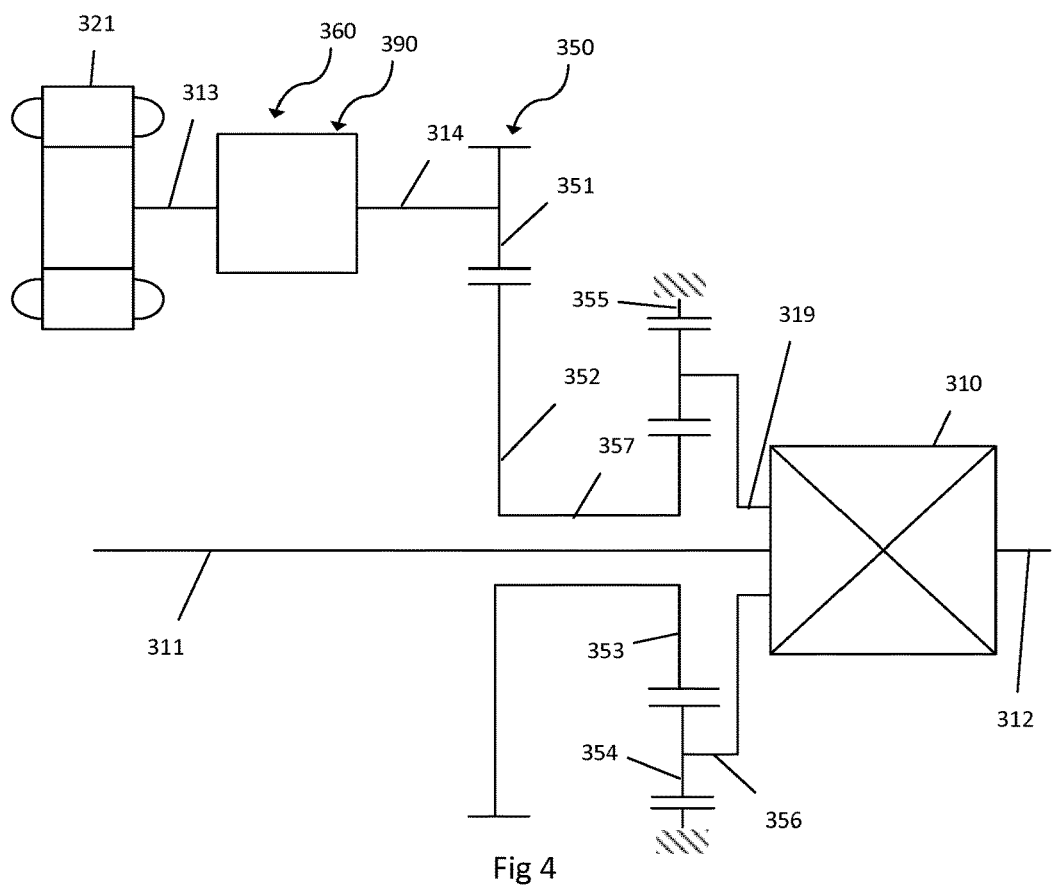
FIG. 4 shows a schematic outline of a vehicle drive system enabling hybrid drive and variable transmission according to an embodiment.
Figure 5:
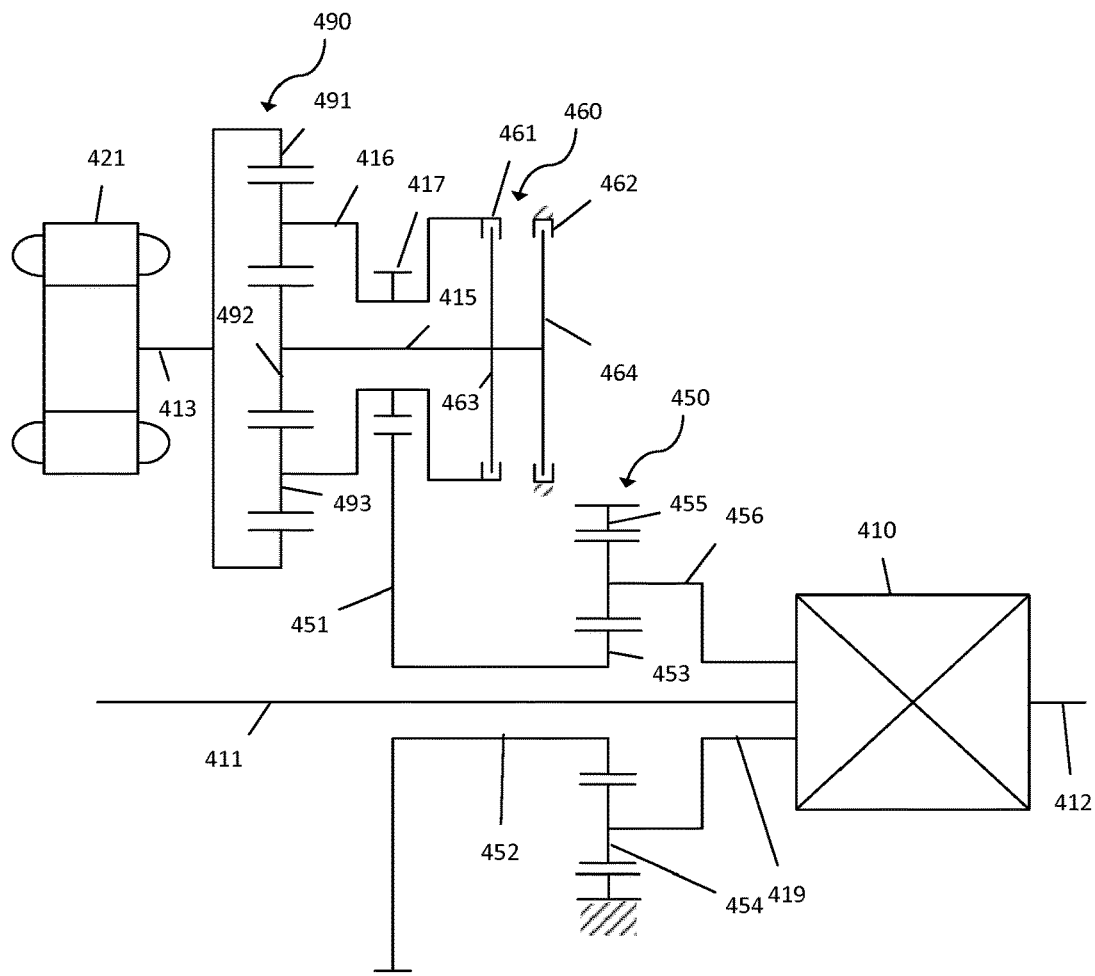
FIG. 5 shows a schematic outline of a vehicle drive system enabling hybrid drive and variable transmission according to an embodiment.

In FIGS. 3-5 another aspect of the invention is presented. According to said aspect a primary electrical motor is connected to the differential via a dual clutch arrangement instead of implementing additional electrical motors as described above.

In FIGS. 3-5 a vehicle driveline system intended for a vehicle is shown. The vehicle driveline system is configured to be used on either the front or rear axle of the vehicle in order to allow for selective hybrid drive of the associated axle. The vehicle may thus be a front wheel drive vehicle, a rear wheel drive vehicle, or an all wheel drive vehicle. The system shown in FIGS. 3-5 could e.g. be mounted at a rear axle of a front wheel driven vehicle. The system comprises a differential 210, 310, 410 having two output shafts 211, 311, 411 and 211, 311, 411 intended for driving the front wheels of the vehicle.

In order to provide hybrid drive to the output shafts 211, 311, 411 and 212, 312, 412 a primary electrical motor 121 is provided. Said primary electrical motor 221, 321, 421 is configured to provide driving torque to the differential 210, 310, 410 and thereby provide electrical drive of the output shafts 211, 311, 411 and 212, 312, 412.

Since the primary electrical motor usually is require to operate at very high speed for optimum performance, speed reduction is normally required.

As seen in FIGS. 3-5 the vehicle driveline system comprises the primary electrical motor 221, 321, 421 which is connected to the differential 210, 310, 410 via a first reduction gearing 290, 390, 490.

To enable control of the speed of the primary electrical motor 221, 321, 421 and thereby enable safe distribution of torque from said primary electrical motor 221, 321, 421 to the differential the vehicle driveline system is provided with a dual clutch arrangement 260, 360, 460.

Referring to FIGS. 3-5, the first reduction gearing 290, 390, 490 comprises a dual clutch arrangement 260, 360, 460 configured to control the torque provided to the differential 210, 310, 410.

The torque provided is controlled by actuating the dual clutch arrangement so as to alter the gear ratio by altering of the torque path between the differential and primary electrical motor.

Accordingly, the dual clutch arrangement 260, 360, 460 may be configured to to transfer torque in any of the following modes:

i) a first mode wherein torque is transferred at a first transmission ratio; and ii) a second mode wherein torque is transferred at a second transmission ratio.

Referring now to FIG. 3 the vehicle driveline system further comprises an additional clutch arrangement 280 connected to the dual clutch arrangement 260. To allow for further reduction of the speed of the primary electrical motor 221, the additional clutch arrangement 280 is configured to selectively transfer torque to the differential 210 from the electrical motor 221 at a third transmission ratio.

The additional clutch arrangement 280 is connected to the differential 110 via a second reduction gearing 250 also connected to the first reduction gearing 290, whereby the additional clutch arrangement 280 is configured to selectively connect the second reduction gearing 250 and the dual clutch arrangement 260.

As disclosed in FIG. 3 the primary electrical motor 221 is connected to the dual clutch arrangement 260 via a reduction gearing 230, whereby the primary electrical motor 221 is connected with a primary electrical motor shaft 213 attached to a gear 231 of the reduction gearing 230. The reduction gearing 230 is connected to the dual clutch arrangement 260 via a reduction gearing shaft 214 attached to a gear 265 of the clutch arrangement.

Further referring to the dual clutch arrangement 260 shown in FIG. 3 the gear 265 extends into a first 266 and a second 267 cylindrical wall. The first cylindrical wall 266 is attached to a first braking clutch 261 of the dual clutch arrangement 260 and the second cylindrical wall 267 is attached to a second braking clutch 262 of the dual clutch arrangement 260.

Said first braking clutch 261 is configured to selectively lock the gear 265 to a first dual clutch arrangement gear or disc 263 attached to a dual clutch arrangement shaft 215. Said dual clutch arrangement shaft 215 is connected to the differential via an additional reduction gearing 250.

Preferably, a first gear 251 of the reduction gearing 250 is attached to the dual clutch arrangement shaft 215. Furthermore, said reduction gearing 250 may include a last gear 235 attached to a hollow shaft 219 connected to the differential 210.

In order to provide a more compact vehicle driveline system the hollow shaft 219 is arranged substantially coaxially to the output shaft 211 of the differential 210.

Said second braking clutch 262 is configured to selectively lock the gear or disc 265 to a second dual clutch arrangement gear or disc 264 connected to the previously discussed first reduction gearing 290.

Again referring to FIG. 3 the second dual clutch arrangement gear 264 extends into a hollow shaft 268 connected to the first reduction gearing 290 via a gear arrangement 270, whereby a first gear 271 of the gear arrangement is attached to the hollow shaft 268, said first gear 271 meshing with a gear 291 of the first reduction gearing 290.

The previously mentioned additional clutch arrangement 280 allows for further reduction stages by being configured to be actuated so as to selectively connect the dual clutch arrangement shaft 215 to the reduction gearing 250. This is enabled by the additional clutch arrangement 280 comprising an actuated sleeve 281 which can be actuated so as to selectively connect to a clutch disc 282 attached to a clutch arrangement shaft 218. Said clutch arrangement shaft 218 is further attached to the first gear 251 of the first reduction gearing 250. Thereby, a compact way of implementing further reduction steps, i.e. the third mode, can be achieved by selectively transferring torque via the reduction gearing 250.

As further presented in FIG. 3 the first reduction gearing 290 comprises a first gear meshing with the aforementioned gear 271, during the previously discussed first and second mode the actuated sleeve is actuated so as to lock the dual clutch arrangement shaft 215 with a second gear 272 of the clutch arrangement 270. The second gear 272 is connected to first reduction gearing, for example by meshing with a second gear 292 of said first reduction gearing 290.

To provide torque to the differential 210 the first 291 and second 292 gearing of the reduction gearing 290 is attached to a first reduction gearing shaft 216, whereby said first reduction gearing shaft 216 is further attached to a gear 252 of the reduction gearing 250 which is connected to the differential 210.

Now turning to FIG. 4 the primary electrical motor 321 is connected to a first reduction gearing 390 and a dual clutch arrangement 360 via a primary motor shaft 313. In this embodiment the first reduction gearing 390 is a Ravigneaux type planetary gear set, which is a commonly known very compact type of planetary gearing with two sun gears, two ring gears and two sets of planet gears on a single carrier.

According to this embodiment the dual clutch arrangement 360 is configured to control the torque provided to a first and second sun gear of the Ravigneaux type planetary gear set respectively.

By independently braking a first and second ring wheel of the Ravigneaux planetary gearing with a first and second brake clutch of the dual clutch arrangement 390 torque can be transferred to the differential 310 from the electrical motor at three transmission rates. Accordingly the aforementioned first and second modes can be achieved as well as an additional third mode wherein the dual clutch arrangement 360 is further configured to transfer torque to the differential 310 from the electrical motor 321 at a third transmission rate. Thereby, several reduction modes can be achieved in a very compact manner.

Further referring to FIG. 4, the first reduction gearing 390 is connected to the differential 310 via a second reduction gearing 350. For space saving purposes the second reduction gearing 350 may comprise a hollow shaft 357 arranged substantially coaxially to the output shaft 311.

Still referring to FIG. 4 the Ravigneaux planetary gearing 360 is connected via the dual clutch arrangement 390 to the second reduction gearing 350 which in turn is connected with the differential 310. Said planeraty gearing 360 and dual clutch arrangement 390 transfers torque via a first reduction gearing shaft 314 to which a gear 351 of the second reduction gearing 350 is attached. Said gear 351 is connected with the hollow shaft 357 via a gear 352 of the second reduction gear attached to said hollow shaft 357. This leads to a more compact vehicle driveline system.

In order to provide further reduction of the transmission ratio in a compact manner the hollow shaft 357 may be connected to the differential 310 via additional gearing, preferably planetary gearing. Thus, a sun wheel 353 is attached to said hollow shaft 357, whereby a planet carrier 356 for a set of planetary gears 354 extends into a hollow shaft 319 which transfers torque into the differential 310, e.g. is connected to the differential 310. Advantageously, the hollow shaft 319 is similar to the hollow shaft 357 coaxial to the output shaft 311.

Now turning to FIG. 5 wherein a different embodiment is shown. According to this embodiment the dual clutch arrangement 460 is configured to selectively control the torque provided to a first gear 492 of a first reduction gearing 490.

Furthermore, the clutch arrangement 460 is arranged between a second gear 493 of the first reduction gearing 490 connected to the first gear 492 of said first reduction gearing 490 and said first gear 492.

To achieve a more compact vehicle driveline system the first reduction gearing 490 is preferably a planetary gearing, whereby the first gear 492 is a sun gear and the second gear 493 is a set of planetary gears.

Referring to FIG. 5 the primary electrical motor 421 is connected to the first reduction gearing 490 via a primary electrical motor shaft 413 connected to a ring wheel 491 of the first reduction gearing 190.

To provide the torque to the differential 410 the second gear 493 is attached to a hollow shaft 416 formed by a planet carrier attached to the set of planetary gears 493, whereby said hollow shaft 416 is attached to the dual clutch arrangement 460, thereby providing torque. Also, the dual clutch arrangement 460 may be configured to selectively connect said hollow shaft 416 to a dual clutch shaft (415) attached to the first gear 492 e.g. the sun gear.

Again referring to FIG. 5 the first reduction gearing 490 is connected to the differential 410 via a second reduction gearing 450, whereby said second reduction gearing 450 comprises a first gear 451 meshing with a hollow shaft gear 417 attached to the hollow shaft 416.

For space saving purposes the second reduction gearing 450 may be arranged coaxially to the output shaft 411. This and further alteration of the transmission ratio can be achieved by the hollow shaft 452 having an additional gear 453 of the second reduction gearing 450 attached thereto, whereby the gear 453 of the second reduction gearing 450 may be a sun gear in a planetary gearing. Said planetary gearing further comprises a set of planetary gears 454 of the second reduction gearing, whereby a planet carrier 456 of the second reduction gearing attached to said set of planetary gears. Advantageously, said planet carrier 456 into an additional hollow shaft 419 connected to the differential 410. To achieve a more compact vehicle driveline system said additional hollow shaft 419 may be arranged coaxially to the first output shaft.

As disclosed in FIG. 5 the dual clutch arrangement 460 comprises a first 461 and a second 462 brake clutch. To achieve the aforementioned first and second mode, the first brake clutch 461 is configured to selectively lock a first dual clutch disc 463 attached to the dual clutch shaft 415 to the hollow shaft 416, while the second brake clutch 462 is configured to selectively lock a second dual clutch disc 463 thereby locking the movement of the sun gear 492. Due to the dual clutch arrangement 460 selectively locking or providing torque to the gear 492 the aforementioned two modes with a first and a second transmission ratio respectively can be achieved.

Figure 6:
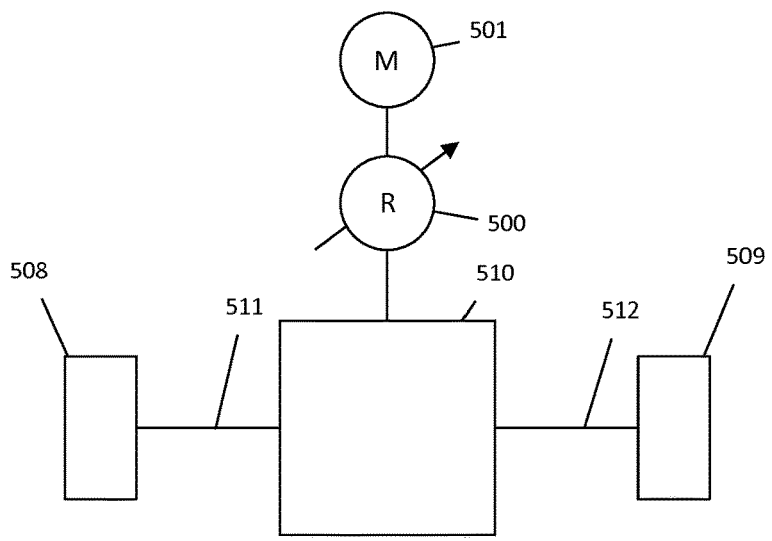
FIG. 6 shows a schematic layout of a vehicle comprising a vehicle drive system enabling hybrid drive and variable transmission according to an embodiment.
Figure 7:
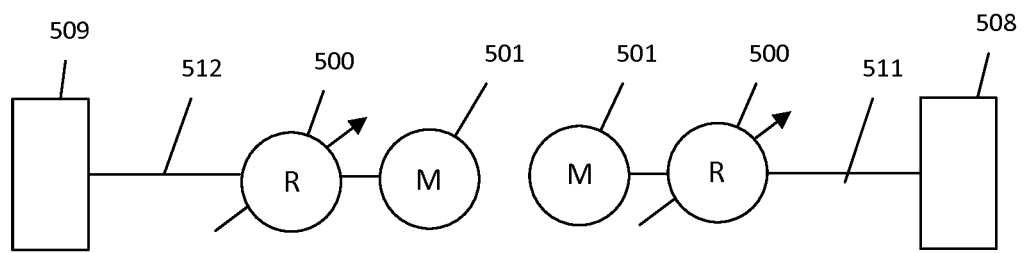
FIG. 7 shows a schematic layout of a vehicle comprising a vehicle drive system enabling hybrid drive and variable transmission according to an embodiment.
Figure 8:
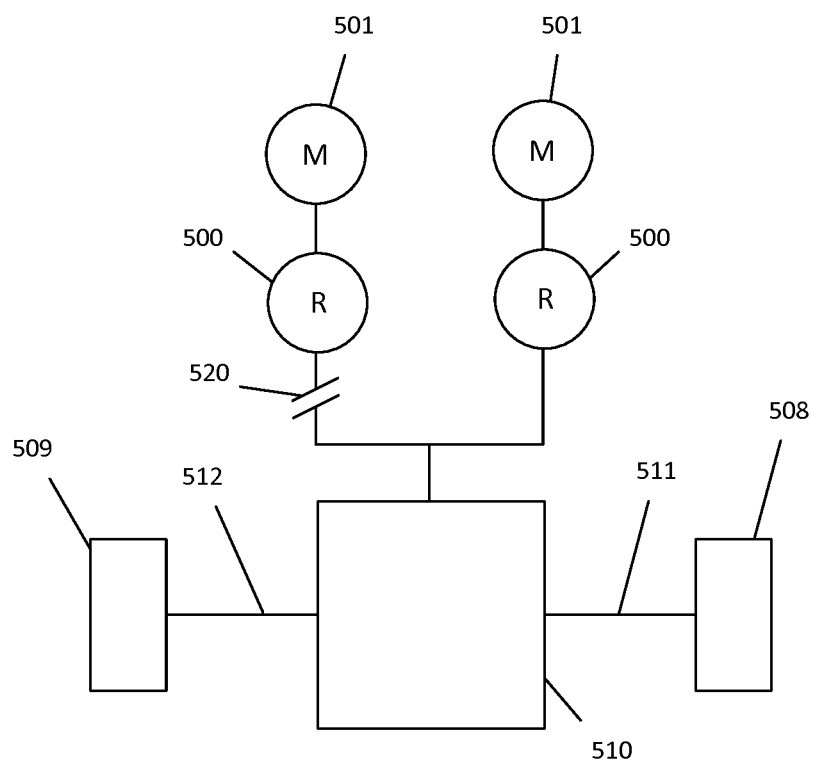
FIG. 8 shows a schematic layout of a vehicle comprising a vehicle drive system enabling hybrid drive and variable transmission according to an embodiment.

FIGS. 6-8 shows vehicle driveline systems according to any of the aforementioned aspects of the invention.

FIG. 6 discloses a vehicle driveline system comprising a primary electrical motor 501 connected to a differential 510 with an arrangement 500 according to any of the aforementioned embodiments. As can be derived from said figure the differential 510 is connected to a first 508 and second wheel 509 via two output shafts 511, 512.

FIGS. 7-8 disclosed embodiments wherein an additional primary electrical motor 501 is used with an arrangement 500 according to any of the aforementioned embodiments.

In FIG. 7 there is no differential present, but instead one electrical motor 501 and one variable transmission 500 is provided for each wheel shaft 511, 512.

Referring to FIG. 8 said additional primary electrical motor 501 and arrangement 500 according to any of the aforementioned embodiments may be connected to the differential via a clutch 520, further allowing for further control of the torque provided to the differential 510.

Although the present invention has been described above with reference to specific embodiments, it is not intended to be limited to the specific form set forth herein. Rather, the invention is limited only by the accompanying claims.

The invention claimed is:

1. A vehicle driveline system for a vehicle, said system comprising a differential having two output shafts being connectable with respective wheel shafts,
   a primary electrical motor being connected with a driving input of the differential via a first reduction gearing, said first reduction gearing being connected to a secondary electrical motor for adjusting the gear ratio of the first reduction gearing;
   whereby the secondary electrical motor is connected to a clutch arrangement configured to selectively lock the gear ratio of the first reduction gearing whereby the first reduction gearing is a planetary gearing, whereby the primary electrical motor is connected to the first reduction gearing via a primary electrical motor hollow shaft attached to a first gear of the first reduction gearing, whereby said first gear of the first reduction gearing is a ring wheel and whereby the secondary electrical motor is connected to a sun wheel of the first reduction gearing.

2. The vehicle driveline system according to claim 1, whereby the primary and the secondary electrical motor are disposed substantially coaxially to each other.

3. A vehicle driveline system for a vehicle, said system comprising a differential having two output shafts being connectable with respective wheel shafts,
   a primary electrical motor being connected with a driving input of the differential via a first reduction gearing, said first reduction gearing being connected to a secondary electrical motor for adjusting the gear ratio of the first reduction gearing;
   whereby the secondary electrical motor is connected to a clutch arrangement configured to selectively lock the gear ratio of the first reduction gearing, whereby the first reduction gearing is a planetary gearing, further comprising a third electrical motor configured to transfer torque to the differential, whereby the third electrical motor is configured to provide torque proportional to torque loss associated with the activation of the secondary electrical motor and whereby the third electrical motor is disposed coaxially to the differential.

4. The vehicle driveline system according to claim 3, whereby the third electrical motor is connected to the differential via a hollow third electrical motor shaft, whereby a first gear of a second reduction gearing is attached to said hollow third electrical motor shaft.

5. A vehicle driveline system for a vehicle, said system comprising a differential having two output shafts being connectable with respective wheel shafts,
   a primary electrical motor being connected with a driving input of the differential via a first reduction gearing, said first reduction gearing being connected to a secondary electrical motor for adjusting the gear ratio of the first reduction gearing;
   whereby the secondary electrical motor is connected to a clutch arrangement configured to selectively lock the gear ratio of the first reduction gearing, whereby the first reduction gearing is a planetary gearing, said vehicle driveline system comprises an additional primary electrical motor connected to the differential in the same manner as the original primary electrical motor.

6. A vehicle driveline system for a vehicle, said system comprising a differential having two output shafts being connectable with respective wheel shafts, a primary electrical motor being connected with a driving input of the differential via a first reduction gearing; whereby the first reduction gearing comprises a dual clutch arrangement configured to adjust the gear ratio of the first reduction gearing, whereby the first reduction gearing is a Ravigneaux type planetary gear set and the dual clutch arrangement is configured to control the gear ratio by controlling a clutch, a first brake, and/or a second brake, wherein the dual clutch arrangement is further configured to transfer torque to the differential from the electrical motor to the differential at a third transmission rate, whereby the first reduction gearing is connected to the differential via a second reduction gearing, and whereby the second reduction gearing comprises a hollow shaft arranged substantially coaxially to one of said output shafts.

7. The vehicle driveline system according to claim 6, whereby the dual clutch arrangement is configured to transfer torque in any of the following modes:

a first mode wherein torque is transferred at a first transmission ratio; and a second mode wherein torque is transferred at a second transmission ratio whereby said vehicle driveline system further comprises an additional clutch arrangement connected to the dual clutch arrangement, whereby the additional clutch arrangement is configured to selectively transfer torque to the differential from the electrical motor at a third transmission ratio.

8. The vehicle driveline system according to claim 7, whereby the additional clutch arrangement is connected to the differential via a second reduction gearing also connected to the first reduction gearing, whereby the additional clutch arrangement is configured to selectively connect the second reduction gearing and the dual clutch arrangement.

9. The vehicle driveline system according to claim 6, whereby said vehicle driveline system comprises an additional primary electrical motor connected to the differential in the same manner as the original primary electrical motor.

10. A vehicle driveline system for a vehicle, said system comprising a differential having two output shafts being connectable with respective wheel shafts, a primary electrical motor being connected with a driving input of the differential via a first reduction gearing; whereby the first reduction gearing comprises a dual clutch arrangement configured to adjust the gear ratio of the first reduction gearing, wherein the dual clutch arrangement is configured to selectively control the torque provided to a first gear of the first reduction gearing whereby the clutch arrangement is arranged between a second gear of the first reduction gearing connected to the first gear of said first reduction gearing, whereby the first reduction gearing is a planetary gearing and the first gear is a sun gear and the second gear is a planet carrier and whereby the second gear is attached to a hollow shaft, whereby said hollow shaft is attached to the dual clutch arrangement, whereby the dual clutch arrangement is configured to selectively connect said hollow shaft to a dual clutch shaft attached to the first gear.

11. The vehicle driveline system according to claim 10, whereby the first reduction gearing is connected to the differential via a second reduction gearing whereby said second reduction gearing comprises a first gear meshing with a hollow shaft gear attached to the hollow shaft and whereby the second reduction gearing is arranged coaxially to one of said output shafts.

\* \* \* \* \*